July 1, 1930.   E. W. BEARDSLEY   1,768,880
MEANS FOR COOLING VALVES
Filed Oct. 6, 1928
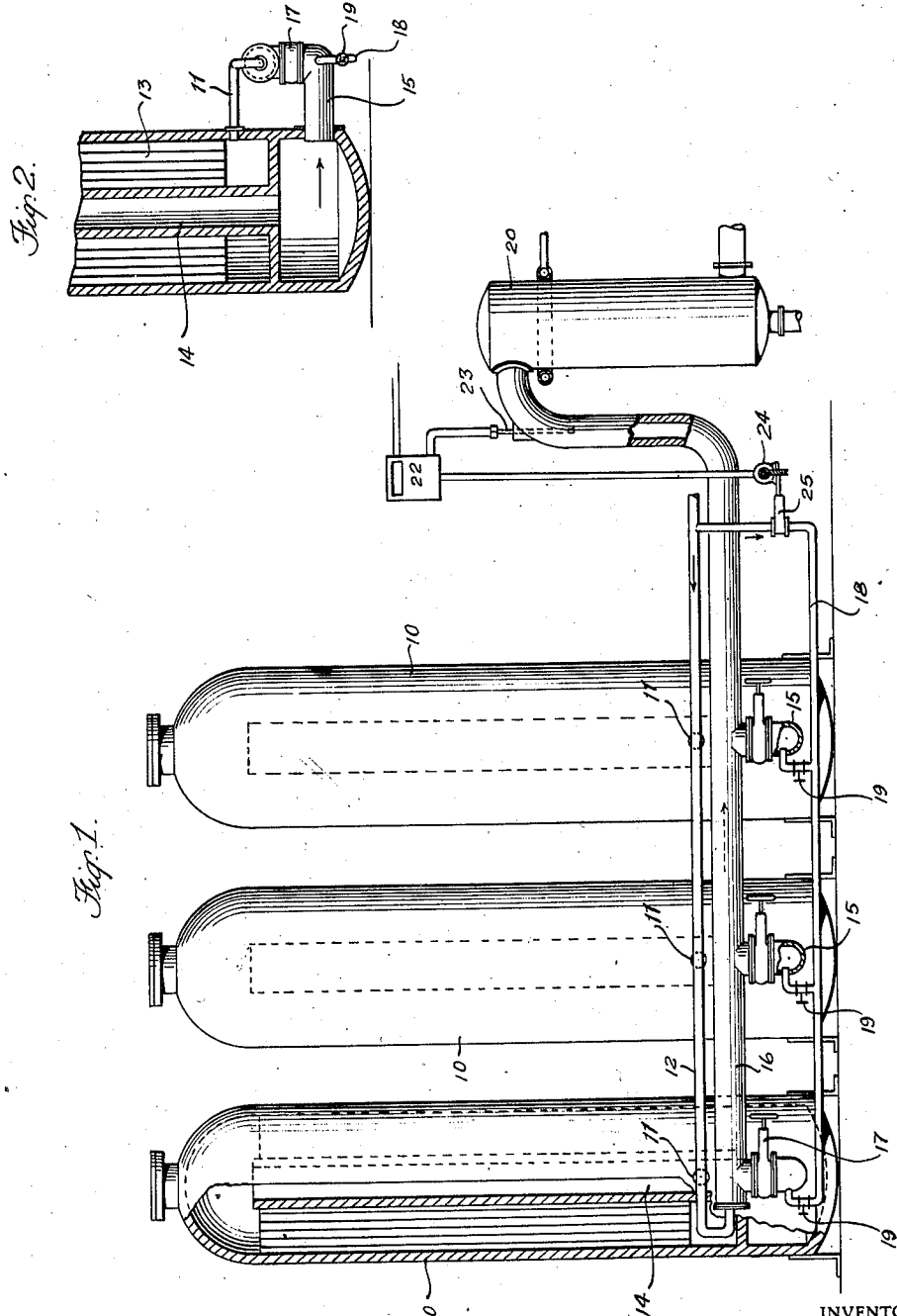
INVENTOR
EDWIN W. BEARDSLEY
BY
ATTORNEY Patented July 1, 1930

1,768,880

UNITED STATES PATENT OFFICE

EDWIN W. BEARDSLEY, OF TEXAS CITY, TEXAS, ASSIGNOR TO PETROLEUM CONVERSION CORPORATION, OF NEW YORK, N. Y., A CORPORATION OF DELAWARE

MEANS FOR COOLING VALVES

Application filed October 6, 1928. Serial No. 310,865.

The present invention relates to a system of employing hot blast stoves and more particularly to means for cooling the valves admitting hot gas from such stoves to the hot gas main. Where, as is usual, the gas temperatures employed are in excess say of 1400 degrees F. the problem of cooling the valves admitting the hot gas from the stoves to the hot gas main, for example, is a serious one. In instances where it is desired to maintain a gas output of substantially constant temperature, this is usually accomplished by admitting to the hot gas main relatively cold gas which conveniently may be taken from the stream of such gas on its way to the hot blast stove and which is varied in quantity as the temperature of the stove and hence that of the gas, falls.

It is therefore an object of the invention to cool the valve (or valves) through which the hot gas from the stove passes by directing a stream of relatively cold gas immediately behind such valve and, as a further object, to utilize the flow of this cold gas for the purpose, partially at least, of regulating the temperature of the gas in the main. It will be seen that where gas having a constant temperature is required, the greatest amount of cooling gas will be added to the stream issuing from the stove when the temperature of such gas stream is the highest and hence, when the valves are in greatest need of being cooled. Similarly, although less of the tempering gas will be added as the temperature of the gas from the stove falls, there will be less need therefor, due to such fall in temperature.

My invention will be best understood by reference to the following detailed description taken with the annexed drawing, Fig. 1 showing a battery of hot blast stoves for use in connection with an oil cracking process, to which my invention has been applied, although it will be understood that the invention is applicable to other systems utilizing hot gas from such a source and Fig. 2 showing a sectional view of the lower portion of a stove.

Referring to said drawings, 10 denotes one of a series of three hot blast stoves of known type, having an inlet 11, for cold gas, supplied by a cold gas main 12, the course of the gas through the stove being upward through the flues formed by the checkerwork 13, see Fig. 2, and downward through a central main flue or passage 14, and thence to the hot gas outlet 15. Outlet 15 communicates with the hot gas main 16 and contains a valve 17 of known type. Cold gas from the main 12 is admitted through a supply pipe 18 having a valve 19, it being noted that pipe 18 admits the gas directly behind valve 17 whereby the valve will be cooled by the high concentration of cold gas there prevailing.

The gas mixture of the desired temperature is conducted from the main 16 and in the embodiment shown is fed to the reaction chamber 20 for the purpose of imparting heat to the oil undergoing conversion.

The regulation of the gas temperature may be accomplished by regulating the various valves 19 manually, or such regulation preferably is accomplished by an automatic device 22 of known type consisting of a pyrometer 23 in the hot gas main 16 which device by means of a motor 24 controlling valve 25 admits a final regulating quantity of the cold gas into the main 18, supplying gas behind the valves 17.

If desired, depending upon the particular circumstances at hand, including especially the desired constant temperature of the gas, the valve 25 will be regulated so as to permit a small quantity of the cooling gas to be admitted behind the valves 17 at all times.

Various other means for admitting the required amount of the cooling gas may be used apart from that shown while at the same time carrying out the principle of the invention.

What I claim is:

1. In combination, a hot blast stove, a hot gas main and a cold gas main leading thereto, a valve in said hot gas main adjacent the stove and means for regulating the temperature of the gas in said hot gas main, comprising a bypass from said cold gas main to said hot gas main, said bypass entering said hot gas main directly behind said valve, and automatic means for supplying a varying quantity of cold gas behind said valve whereby to maintain the temperature of the gas mixture substantially constant over the working temperatures of said stove.

2. In combination, a hot blast stove, a hot gas main, a connection between said main and said stove, a hot gas valve in said connection admitting gas from said stove to said main, and means for regulating the temperature of gas delivered by said main comprising a source of relatively cold gas and a connection from said source admitting said cold gas behind said hot blast valve whereby the tempering of said gas takes place prior to said valve.

In testimony whereof I have affixed my signature to this specification.

EDWIN W. BEARDSLEY.